(12) United States Patent
Lucas et al.

(10) Patent No.: US 10,253,170 B2
(45) Date of Patent: Apr. 9, 2019

(54) POLYISOPRENE/POLYCHLOROPRENE COMPOSITIONS

(71) Applicant: Ansell Limited, Richmond, Victoria (AU)

(72) Inventors: David Lucas, Selangor (MY); Soo Hwa Kwan, Melaka (MY); Christina Foo Lik Erh, Melaka (MY)

(73) Assignee: Ansell Limited, Victoria (AU)

(*) Notice: Subject to any disclaimer, the term of this patent is extended or adjusted under 35 U.S.C. 154(b) by 350 days.

(21) Appl. No.: 14/224,832

(22) Filed: Mar. 25, 2014

(65) Prior Publication Data
US 2015/0272241 A1 Oct. 1, 2015

(51) Int. Cl.
| C08L 11/00 | (2006.01) |
| A41D 19/00 | (2006.01) |
| C08L 9/00 | (2006.01) |
| A41D 19/04 | (2006.01) |

(52) U.S. Cl.
CPC ............ *C08L 9/00* (2013.01); *A41D 19/0065* (2013.01); *C08L 11/00* (2013.01); *A41D 2500/54* (2013.01)

(58) Field of Classification Search
None
See application file for complete search history.

(56) References Cited

U.S. PATENT DOCUMENTS

| 4,012,332 A | 3/1977 | Behrens |
| 4,329,312 A | 5/1982 | Ganz |
| 4,956,434 A | 9/1990 | Stanislawczyk |
| 6,019,922 A * | 2/2000 | Hassan ............. A41D 19/0058 264/130 |
| 6,195,805 B1 | 3/2001 | Bourne et al. |
| 6,207,764 B1 | 3/2001 | Ignatz-Hoover |
| 6,242,526 B1 | 6/2001 | Siddiqui et al. |
| 6,329,457 B1 | 12/2001 | Datta et al. |
| 6,391,409 B1 | 5/2002 | Yeh et al. |
| 6,569,375 B1 | 5/2003 | McGlothlin et al. |
| 6,618,861 B2 | 9/2003 | Saks et al. |
| 6,709,725 B1 | 3/2004 | Lai et al. |
| 7,048,884 B2 | 5/2006 | Woodford et al. |
| 7,084,204 B2 | 8/2006 | Nile et al. |
| 7,101,922 B2 | 9/2006 | Chen et al. |
| 7,196,129 B2 | 3/2007 | Migliarini et al. |
| 7,455,863 B2 | 11/2008 | Hamann |
| 7,527,828 B2 | 5/2009 | Hassan et al. |
| 7,566,502 B1 | 7/2009 | Chen et al. |

(Continued)

FOREIGN PATENT DOCUMENTS

| CN | 100528952 C | 8/2009 |
| CN | 103025514 A | 4/2013 |

(Continued)

OTHER PUBLICATIONS

Wuestenberg, Cellulose and Cellulose Derivatives in the Food Industry, John Wiley & Sons, 2014, p. 201 (Year: 2014).*

(Continued)

*Primary Examiner* — Callie E Shosho
*Assistant Examiner* — Patrick N English
(74) *Attorney, Agent, or Firm* — Moser Taboada

(57) ABSTRACT

Polymer compositions that include polyisoprene and polychloroprene and methods for manufacturing protective articles from the polymer compositions are disclosed.

13 Claims, 2 Drawing Sheets

(56) References Cited

U.S. PATENT DOCUMENTS

| | | |
|---|---|---|
| 7,758,557 B2 | 7/2010 | Faulks et al. |
| 7,766,062 B2 | 8/2010 | Hirayama |
| 7,923,505 B2 | 4/2011 | Zhou et al. |
| 8,110,266 B2 | 2/2012 | Chen et al. |
| 8,187,684 B2 | 5/2012 | Teoh et al. |
| 8,227,538 B2 | 7/2012 | York et al. |
| 8,273,810 B2 | 9/2012 | Wang et al. |
| 2003/0204008 A1* | 10/2003 | Campion .............. C08K 5/0025 524/495 |
| 2005/0065249 A1 | 3/2005 | Dzikowicz |
| 2005/0133041 A1 | 6/2005 | Tune |
| 2006/0010565 A1 | 1/2006 | Teoh et al. |
| 2006/0094831 A1* | 5/2006 | Choi .................... B60C 1/00 525/331.9 |
| 2006/0150300 A1 | 7/2006 | Hassan et al. |
| 2006/0222688 A1 | 10/2006 | Weiss et al. |
| 2008/0306200 A1 | 12/2008 | Chen et al. |
| 2009/0044571 A1 | 2/2009 | Thompson et al. |
| 2009/0106981 A1 | 4/2009 | Palmer et al. |
| 2009/0107513 A1 | 4/2009 | Zedalis et al. |
| 2010/0062170 A1 | 3/2010 | Sha et al. |
| 2010/0263675 A1 | 10/2010 | Chuah et al. |
| 2010/0325777 A1 | 12/2010 | Radhakrishnan et al. |
| 2011/0003158 A1 | 1/2011 | Flather et al. |
| 2011/0067166 A1 | 3/2011 | Jalbert |
| 2011/0203227 A1 | 8/2011 | Chen et al. |
| 2011/0203596 A1 | 8/2011 | Wang et al. |
| 2012/0021155 A1* | 1/2012 | Chen .................... C08K 3/22 428/36.8 |
| 2013/0231443 A1 | 9/2013 | Yamagishi |
| 2013/0253138 A1 | 9/2013 | Yamagishi et al. |

FOREIGN PATENT DOCUMENTS

| | | |
|---|---|---|
| CN | 103221474 A | 7/2013 |
| EP | 0155610 A1 | 9/1985 |
| EP | 1362566 A1 | 11/2003 |
| EP | 1454594 A1 | 9/2004 |
| EP | 2639265 A1 | 9/2013 |
| EP | 2644651 A1 | 10/2013 |
| JP | 5023062 | 8/1975 |
| JP | 2004189919 A | 7/2004 |
| JP | 2007106994 A | 4/2007 |
| JP | 2012111899 A | 6/2012 |
| JP | 2013534555 A | 9/2013 |
| WO | WO-2009019554 A1 | 2/2009 |
| WO | WO2009019554 A1 * | 2/2009 |
| WO | WO-2011163662 A1 | 12/2011 |
| WO | WO-2012063548 A1 | 5/2012 |

OTHER PUBLICATIONS

Dormer Laboratories, Zinc butyldithiocarbamate, Mar. 24, 2009, p. 1 (Year: 2009).*

G. Heideman, "Reduced Zinc Oxide Levels in Sulphur Vulcanisation of Rubber Compounds" http://doc.utwente.nl/41718/1/thesis_Heideman.pdf, 2004, 208 pgs.

Thiuram Mt, "Dipentamethylenethiuram Tetrasulfide," http://chemicalland21.com/specialtychem/perchem/DIPENTAMETHYLENETHIURAM%20TETRASULFIDE.htm, 2 pgs.

Extended European Search Report dated Jul. 31, 2017 for Application No. 15768510.8.

Chinese First Office Action dated Sep. 25, 2017 for Application No. 201580014019.4.

Australian First Patent Examination Report dated Oct. 27, 2017 for Patent Application No. 2015234680.

Japanese Office Action dated Sep. 10, 2018 for Application No. JP-2016553515.

* cited by examiner

POLYISOPRENE/POLYCHLOROPRENE COMPOSITIONS

BACKGROUND

Field of the Invention

Embodiments of the present invention generally relate to polymer blends. More specifically, embodiments of the invention relate to polymer blends comprising a composition of polyisoprene and polychloroprene materials for unsupported barrier products and flexible coatings for supported protective articles.

Description of the Related Art

Gloves, and other protective articles, are used in many industries, such as construction, industrial, and medical, as well as households, to protect the hands of users. For medical applications, such as examination and surgical gloves, gloves promote protection against germs, viruses, and microbes. Particularly for surgical gloves, it is important that the gloves have high resistance to tears while remaining flexible so that intricate procedures, in which scalpels, forceps, hemostats, and the like are used, can be performed. However, current gloves, which are made of polyisoprene, are relatively weak and are susceptible to breach during use and particularly extended use, increasing the risk of infection from doctor to patient and vice versa. Moreover, natural polyisoprene contains a high amount of proteins, which cause allergic reactions in many people while synthetic polyisoprene, which is less allergenic, is expensive to produce.

To address these problems, gloves have been produced using various synthetic thermoplastic elastomers, such as polyurethanes and styrene block copolymers. Such gloves can suffer from inherent stiffness. Also, other attempts to improve the physical properties of natural and synthetic polyisoprene for gloves have largely failed. For example, various additives, such as diphenyl guanidine, have been used in rubber compositions to improve flexibility, which decreases, for e.g., abrasion- and tear-resistance. Some attempts have included different combinations of accelerators, although none have provided an adequate balance of physical properties, i.e., flexibility, tensile strength, abrasion-resistance, tear-resistance, moisture absorption, and/or the like.

Therefore, polymeric, elastomeric, or latex compositions and/or blends thereof, used to make surgical or examination gloves or coatings for fabric liners or condoms, having acceptable tensile strength and other physical properties while remaining soft and flexible, would represent an advance in the art.

SUMMARY

Polyisoprene and polychloroprene polymer compositions or blends substantially as shown in and/or described in connection with at least one of the figures, as set forth more completely in the claims, are disclosed. Various advantages, aspects, and novel features of the present disclosure will be more fully understood from the following description and drawings.

The foregoing summary is not intended, and should not be contemplated, to describe each embodiment or every implementation of the present invention. The Detailed Description and exemplary embodiments therein more particularly exemplify the present invention.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings and disclosure depict exemplary embodiments of the invention and are therefore not to be considered limiting of the scope of the particular forms described, for those skilled in the art will recognize additional embodiments of the present invention, which covers all modifications, equivalents, and alternatives within the spirit and scope of the present invention as defined by the appended claims.

Figure 1:
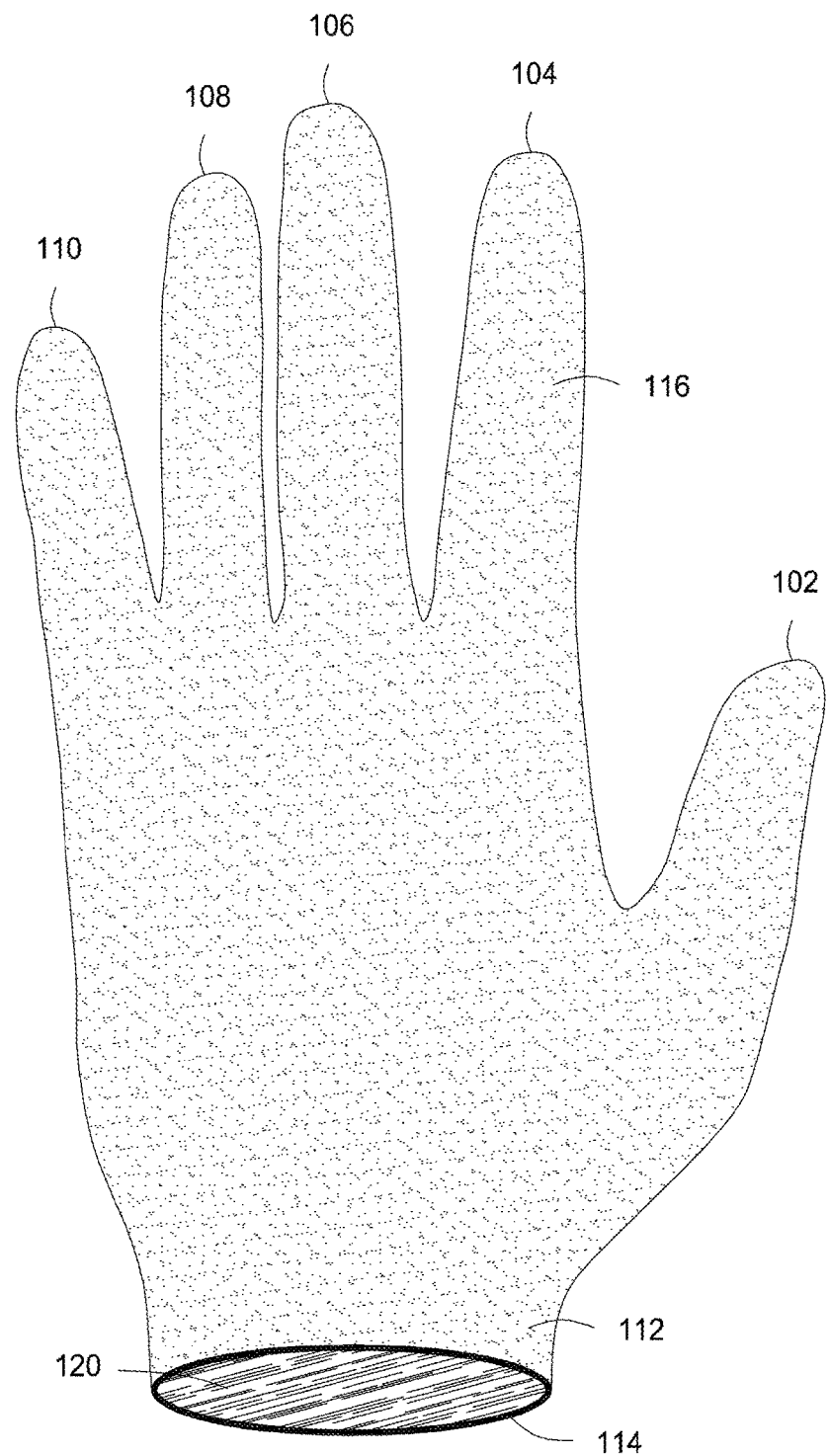
FIG. 1 depicts a glove comprising a polymeric layer, according to embodiments of the present invention.

The headings used herein are for organizational purposes only and are not meant to be used to limit the scope of the description or embodiments according to the invention. As used throughout this application, the word "may" is used in a permissive sense, meaning having the potential to, rather than the mandatory sense. Similarly, the words "include," "including," and "includes" mean including, but not limited to.

DETAILED DESCRIPTION

Embodiments according to the present invention include polymeric, elastomeric, or latex compositions comprising blends of natural and/or synthetic polyisoprene and polychloroprene. Synthetic polyisoprene is expensive and exhibits excellent tactile sensitivity and flexibility. And, a typical curing accelerator used in polyisoprene compositions is diphenyl guanidine (DPG), which is a known skin sensitizer. Polychloroprene is less expensive but is relatively stiff. A blend of polyisoprene and polychloroprene, having no DPG, has been surprisingly shown to produce coatings and/or rubber layers that are adequately cured, while remaining strong as well as flexible. The blends further comprise one or more polysulphidic donors and, in some embodiments, contain little elemental sulfur. The composition and/or blends can be used to make protective articles, for example, an unsupported glove or a coating for a supported glove that includes a fabric liner. Other protective articles, such as condoms, are also contemplated as being within the scope of the invention.

Compositions according to the invention comprise blends of between 40-60% of each of polyisoprene and polychloroprene and at least one curative agent or accelerator comprising a polysulphidic sulfur donor, such as dipentamethylene thiuram tetrasulphide (DPTT) or a xanthogen polysulphide, such as di-isopropyl xanthogen polysulphide, such as ROBAC® AS-100. Additionally, compositions can comprise other accelerators, such as dithiocarbamates, thiazoles, or thioureas. In some embodiments, the accelerator comprises at least one of zinc dibutyl dithiocarbamate (ZDBC), zinc 2-mercaptobenzothiazole (ZMBT), N—N'-diphenylthiourea (DPTU), zinc diethyl dithiocarbamate (ZDEC), or sodium dibutyl dithiocarbamate (SDBC), while in other embodiments, a combination of two or more accelerators are used. Comparative compositions (A, B, D, and E) and an exemplary embodiment (Composition C) according to the present invention comprise polymeric, elastomeric, or latex compositions as shown in Table 1.

Without intending to be bound by theory, it is believed that Composition C, which is free of DPG and comprises polysulphidic sulphur donors, such as DPTT and/or a xanthogen polysulphide unexpectedly provide the soft, flexible yet strong rubber barrier layer. It is noted that Composition C was superior in terms of unaged tensile strength, tear strength, and elongation at break, while remaining soft and flexible with excellent tactility. The use of DPG in rubber compositions is known to produce stiff films or coating layers, the absence of which promotes the softness of the layers. The enhanced tensile strength, tear strength, and elongation at break properties, may be attributed to the polysulphidic sulphur donor, which inter-crosslinks rubber molecules and also creates polysulphidic intra-crosslinks within the rubber network. A polysulphidic sulphur donor is a type of accelerator that "donates" sulphur to the crosslinking reaction. Typically, these types of accelerators can crosslink rubber using lesser amounts of elemental sulphur in the composition and will produce a polysulphidic crosslink. Moreover, it is also believed that the synergy of the polysulphidic sulphur donor with other accelerators produces a balance of polysulphidic, disulphic, and monosulphidic crosslinks, providing enhanced unaged and aged physical properties.

TABLE 1

Table 1: Components

| Total PHR | Composition A | Composition B | Composition C | Composition D | Composition E |
|---|---|---|---|---|---|
| Polyisoprene | 100 | 50 | 50 | 50 | 50 |
| Polychloroprene | — | 50 | 50 | 50 | 50 |
| Sulfur dispersion | 1.6 | 1.6 | 1.6 | 3.2 | 1.6 |
| Flow Modifier | 0.1 | 0.1 | 0.1 | 0.4 | 0.4 |
| Activator | 0.7 | 0.7 | 0.7 | 3.0 | 3.0 |
| Antioxidant | 2.0 | 2.0 | 2.0 | 2.0 | 2.0 |
| ZDBC | 0.1 | 0.1 | 0.1 | 0.8 | 0.8 |
| ZMBT | 0.2 | 0.2 | 0.2 | — | — |
| DPG | 0.3 | 0.3 | — | — | — |
| DPTU | — | — | — | 0.8 | 0.8 |
| DPTT | — | — | 0.3 | — | — |
| ZDEC | 0.6 | 0.6 | 0.6 | — | — |
| SDBC | 0.1 | 0.1 | 0.1 | — | — |
| Xanthogen Polysulphide | 0.4 | 0.4 | 0.4 | — | — |

Table 2 displays an unexpected excellent balance of physical properties for embodiments of the invention, such as high ultimate tensile strength, low modulus (or stress) at 500% elongation, and high elongation at break. M500 modulus is a measure of the stress exerted by the film at an elongation of 500% and is a good indicator of film softness. A lower M500 modulus value indicates a softer film and enhanced tactile sensitivity. Additionally as can also be evidenced from Table 2, composition C shows a tensile strength retention of 96%, after accelerated aging. This is an excellent indicator that a glove made from composition C will have improved aging characteristics compared with other examples and most significantly as compared with composition A, which contains only polyisoprene rubber.

TABLE 2

| | Composition A | Composition B | Composition C | Composition D | Composition E |
|---|---|---|---|---|---|
| Unaged | | | | | |
| UTS, MPa | 24.9 | 25.2 | 23.6 | 20.6 | 18.4 |
| M500, MPa | 2.1 | 2.1 | 1.9 | 3.3 | 2.5 |
| EB, % | 1038 | 1053 | 1131 | 870 | 948 |
| Aged (70° C. - 166 hrs) | | | | | |
| UTS, MPa | 20.4 | 23.4 | 22.8 | 18.6 | 17.2 |
| M500, MPa | 2.0 | 2.4 | 2.4 | 3.8 | 3.0 |
| EB, % | 1015 | 961 | 1022 | 758 | 822 |
| TS Retention, % | 82 | 93 | 96 | 90 | 94 |

Other components known to those in the art may be incorporated within the above compositions. For example, stabilizers, such as sodium salts; surfactants, such as acetylenic diols, thickeners, such as polyacrylate/methacrylic acid-acrylic ester copolymer/cellulose ether; fillers; antimicrobial agents, de-foaming agents, waxes, matting agents, and pigments may be added to compositions A-E described in Table 1. Also, exemplary embodiments of the invention, such as compositions C-E, need not comprise each and every component, as shown in Table 1.

Moreover, exemplary embodiments of the invention comprise a polymeric, elastomeric, or latex composition having a viscosity in the range of approximately 1-5000 centipoises. Some exemplary embodiments further include the compositions of Table 1 having a viscosity in the range of 1-100 centipoises and total solids content (TSC) of 20-50%. The compositions C-E are compounded. For example, the polyisoprene latex, the polychloroprene latex, the sulphur dispersion and a stabilizer solution are delivered to a vessel and mixed at approximately 4-15 RPM at a temperature ranging from approximately 5-35° C., as is known by those having skill in the art. Thereafter, an activator, such as zinc oxide, one or more accelerators (ZDBC, ZMBT, ZDEC) and DPTT, and an antioxidant dispersion, are stirred into the mixture and pre-cured for approximately 20-24 hours. Next, a dispersion of ZDEC, a dispersion of SDBC, a solution of xanthogen polysulphide, an antioxidant dispersion, a stabilizer solution, a flow modifier, and, optionally, a de-foaming agent are stirred into the mixture at approximately 4-15 RPM, holding the temperature of the mixture at approximately 5-35° C. This mixture is allowed to mature for approximately 20-40 hours.

In some embodiments of the invention, the composition, such as compositions C-E from Table 1, is foamed, having dispersed air cells, in a closed- or open-celled structure, in a range of approximately 5 to 70 volumetric percent. In at least one exemplary embodiment, composition C from Table 1 further comprises 0.1-1.5 PHR of an anionic stabilizer, such as sodium linear alkyl benzene sulfonate, or sodium alkyl sulfates, or straight chain carboxylates, such as potassium laurate, potassium caprylate, and the like; and 0.1-3.0 PHR of a thixotropic agent, such as sulfosuccinimates, e.g., sodium N-alkylsulphosuccinamates, disodium N-alkylsulphosuccinamates, and the like.

FIG. 1 depicts a glove 100 comprising a polymeric layer 116, according to embodiments of the present invention. The glove 100 includes a thin layer 116 comprising a composition of polyisoprene and polychloroprene, or blends thereof, as described above, and thumb 102, a palm section 118, fingers 104, 106, 108, and 110 and, optionally, cuff 112 and ring 114. Glove 100 further comprises an internal opening 120 for receiving a hand.

Figure 2:
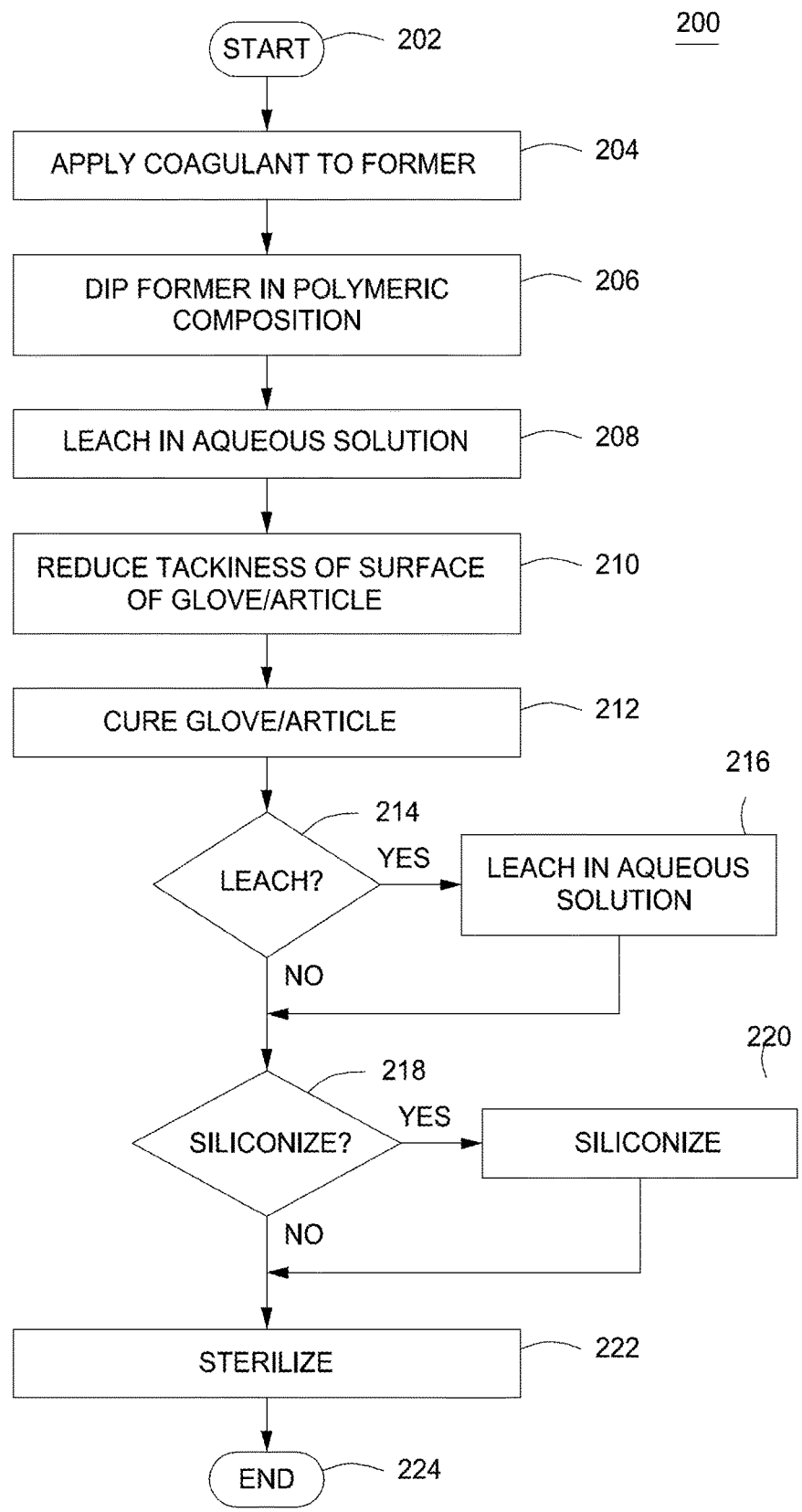
FIG. 2 depicts an exemplary flow diagram for a method for producing a polymeric article, according to embodiments of the invention.

FIG. 2 depicts an exemplary flow diagram for a method 200 for producing an article according to embodiments of the invention. The article may be a protective barrier article, such as a surgical or examination glove, a glove having a fabric liner in which a polymeric layer is disposed thereon as a coating, a condom, or other typical articles comprising polymeric coatings. The method 200 begins at step 202 and proceeds to step 204, at which point a former, such as a glove-shaped former, has a coagulant applied thereto, such as a powdered coagulant or powder-free coagulant for an unsupported glove (or spraying/dipping into an aqueous or alcoholic solution between 1.5-30% calcium nitrate or calcium citrate for a supported glove, i.e., a powder-free coagulant). Optionally, a former is heated before the application of the coagulant. In some embodiments, the former is heated to approximately 50-90° C. At step 206, the method 200 proceeds to dipping the former into a foamed or unfoamed composition, as shown in, for example, Table 1, forming a layer of gelled composition. In some exemplary embodiments, the temperature of the composition in which the former is dipped ranges from approximately 5-35° C.

Embodiments according to the invention also include a foamed polymeric, elastomeric, or latex composition, i.e., dispersed air cells in a range of 1 to 70 volumetric percent, forming closed cells or open cells with interconnected porosity in the coating. Methods for incorporating foamed compositions having air contents between, for example, 1-70% are described in Woodford et al., U.S. Pat. No. 7,048,884, which is commonly assigned and incorporated herein in its entirety. Other methods for foaming compositions having a composition comprising polyisoprene and polychloroprene are described in U.S. Ser. No. 61/969,999, which is commonly assigned and incorporated herein in its entirety.

At step 208 the gelled composition layer is leached in an aqueous solution, for e.g., in water, and, in some embodiments, hot water, such as water at a temperature between 50-90° C.

The method 200 proceeds to step 210, at which point the layer of gelled composition has its surface rendered less tacky, such as by chlorinating the glove or by the disposition of a polymer coating. The polymer coating may include, for example, a layer of a polyurethane and a wax at a temperature of 10-35° C., approximately 2-10 microns thick, disposed on the surface of the article, by methods known to those in the art or, in some embodiments according to the invention, as in U.S. Pat. No. 7,084,204, or 6,709,725 which are commonly assigned and incorporated herein by reference in their entireties. Such layers are disposed on articles to aid in the donning and doffing of the gloves. At step 212, the gelled polymeric layer is cured. Curing is accomplished by heating the glove to an elevated temperature in, for example, any conduction, convection, or radiation oven at, for example, approximately 70-145° C. for approximately 30 to 90 minutes. In some exemplary embodiments, the coating is cured at, for example, 120° C. for 60 minutes.

The method 200 next proceeds to step 214, at which point a decision is made whether to leach the article, e.g., a glove, a second time. If the answer is yes, the article is leached at step 216, stripped from the former, and washed in hot water. If the answer is no, the method 200 proceeds directly to step 218, at which point the decision is made whether to siliconize the article. If the answer is yes, the article is siliconized and dried at step 220. Articles may be siliconized by methods known to those in the art or, in some embodiments according to the invention, as in Ser. No. 14/107,420, which is commonly assigned and incorporated herein by reference in its entirety.

The method 200 proceeds to step 222, if the answer to step 218 is no, whereupon the article, whether siliconized or not, is sterilized. Sterilization can be accomplished by, for example, at least one of electron-beam radiation or gamma radiation. The method 200 ends at step 224. It is to be noted that some steps may be omitted from the method 200. For example, the former need not be heated. Likewise, the glove need not be chlorinated. Also, additional steps may be added, for example, applying a powder as an anti-tack agent within the coagulant, which can aid in stripping and inverting the article, particularly if the article is a glove, from the former. The article may also be further processed with offline washing, drying and surface treatment.

It is further noted that any feature of any embodiment according to the invention can be incorporated within any other embodiment herein. For example, polysulphidic sulphur donors other than those disclosed herein may be added to any composition. Moreover, different compositions comprising other polymeric materials, for example, polyurethanes, styrenic-block copolymers, acrylics, and the like may be admixed therein, creating blends of compositions according to embodiments of the present invention. Moreover, any composition or blend can comprise anionic stabilizers, accelerators, various thixotropic agents, and the like as are known to those in the art.

Although only a few exemplary embodiments of the present invention have been described in detail above, those skilled in the art will readily appreciate that many modifications are possible in the exemplary embodiments without materially departing from the novel teachings and advantages of this invention.

All ranges recited herein include ranges therebetween, and can be inclusive or exclusive of the endpoints. Optional included ranges are from integer values therebetween (or inclusive of one original endpoint), at the order of magnitude recited or the next smaller order of magnitude. For example, if the lower range value is 0.2, optional included endpoints can be 0.3, 0.4 . . . 1.1, 1.2, and the like, as well as 1, 2, 3 and the like; if the higher range is 8, optional included endpoints can be 7, 6, and the like, as well as 7.9, 7.8, and the like. One-sided boundaries, such as 3 or more, similarly include consistent boundaries (or ranges) starting at integer values at the recited order of magnitude or one lower. For example, 3 or more includes 4 or more, or 3.1 or more.

Publications and references, including but not limited to patents and patent applications, cited in this specification are herein incorporated by reference in their entirety and cited as if each individual publication or reference were specifically and individually indicated to be incorporated by reference herein as being fully set forth.

The foregoing description of embodiments of the invention comprises a number of elements, devices, machines, components and/or assemblies that perform various functions as described. These elements, devices, machines, components and/or assemblies are exemplary implementations of means for performing their respectively described functions. While the foregoing is directed to embodiments of the present invention, other and further embodiments of the invention may be devised without departing from the basic scope thereof.

What is claimed is:

1. A soft, strong, hypo-allergenic glove comprising a diphenyl guanidine-free, cross-linked polymeric composition, the cross-linked polymeric composition comprising:
    a synthetic polyisoprene material;
    a polychloroprene material;

polysulphidic donors comprising xanthogen polysulphide and dipentamethylene thiuramtetrasulfide in amounts equal to or less than 0.7 PHR total; and at least one accelerator, an activator, and sulfur in amounts totaling 3.3 PHR of wherein the polymeric composition comprises between 40% to 60% by weight polyisoprene and 40% to 60% by weight polychloroprene, wherein the soft, strong, hypo-allergenic glove further comprises a layer of polyurethane and wax 2-10 microns in thickness disposed thereon.

2. The glove of claim 1, wherein the cross-linked polymeric composition comprises approximately equal amounts by weight of polyisoprene and polychloroprene.

3. The glove of claim 1, wherein the at least one accelerator is a dithiocarbamate, a thiazole, or a long chain thiuram or a combination thereof.

4. The glove of claim 1, wherein the cross-linked polymeric composition comprises each of zinc dibutyl dithiocarbamate, zinc 2-mercaptobenzothiazole, zinc diethyl dithiocarbamate, and sodium dibutyl dithiocarbamate.

5. The glove of claim 1, wherein the at least one activator comprises zinc oxide.

6. The glove of claim 1, wherein the cross-linked polymeric composition is foamed.

7. The glove of claim 1, the cross-linked polymeric composition further comprising a sulfosuccinimate.

8. The glove of claim 1, wherein the glove has a retained tensile strength of at least 95% after aging at 70° C. for at least seven days.

9. The glove of claim 1, wherein the glove is powder-free.

10. The glove of claim 1, wherein the cross-linked polymeric composition comprises a range of 0.1 to 1.5 PHR of an anionic stabilizer.

11. The glove of claim 1, wherein the cross-linked polymeric composition comprises a range of 0.1 to 3.0 PHR of a thixotropic agent.

12. The glove of claim 1, wherein the cross-linked polymeric composition comprises a range of 20-50% total solids content.

13. The glove of claim 1, wherein the glove is a surgical or examination glove.

* * * * *